(12) United States Patent
Stennes et al.

(10) Patent No.: US 8,047,367 B2
(45) Date of Patent: Nov. 1, 2011

(54) SHIPPING AND STORAGE CONTAINERS

(75) Inventors: Mark A. Stennes, St. Peter, MN (US); Douglas M. McMillan, Wayzata, MN (US)

(73) Assignee: VaporLok Technology, LLC, Mankato, MN (US)

( * ) Notice: Subject to any disclaimer, the term of this patent is extended or adjusted under 35 U.S.C. 154(b) by 0 days.

(21) Appl. No.: 12/613,070

(22) Filed: Nov. 5, 2009

(65) Prior Publication Data
US 2010/0083621 A1 Apr. 8, 2010

Related U.S. Application Data

(63) Continuation of application No. 11/105,181, filed on Apr. 13, 2005, now Pat. No. 7,631,758.

(51) Int. Cl.
*B65D 85/42* (2006.01)
(52) U.S. Cl. .............. 206/419; 206/443; 206/524.2
(58) Field of Classification Search .... 206/524.1–524.6, 206/484, 484.1, 484.2, 418–422, 443
See application file for complete search history.

(56) References Cited

U.S. PATENT DOCUMENTS

| | | | |
|---|---|---|---|
| 1,427,351 A | 8/1922 | Bowman | |
| 3,999,653 A | 12/1976 | Haigh et al. | |
| 4,058,479 A | 11/1977 | White et al. | |
| 4,182,447 A | 1/1980 | Kay | |
| 4,416,382 A | 11/1983 | Lawrence et al. | |
| 4,700,838 A * | 10/1987 | Falciani et al. | 206/524.2 |
| 4,712,711 A | 12/1987 | Geering et al. | |
| 4,826,035 A | 5/1989 | Suzuki et al. | |
| 4,964,509 A | 10/1990 | Insley et al. | |
| 4,968,624 A * | 11/1990 | Bacehowski et al. | 206/524.2 |
| 4,978,028 A * | 12/1990 | George et al. | 229/117.28 |
| 5,199,795 A * | 4/1993 | Russo et al. | 206/204 |
| 5,511,657 A | 4/1996 | Gnau, III et al. | |
| 5,553,708 A * | 9/1996 | Lawrence et al. | 206/443 |
| 5,615,795 A * | 4/1997 | Tipps | 229/185.1 |
| 5,664,112 A | 9/1997 | Sturgeon et al. | |
| 5,687,839 A | 11/1997 | Gnau, III et al. | |
| 5,720,789 A | 2/1998 | Pinson | |
| 5,823,379 A | 10/1998 | Friedlander et al. | |
| 5,826,722 A | 10/1998 | Phillips | |
| 5,975,326 A | 11/1999 | Monz | |
| 5,992,634 A * | 11/1999 | Woodring et al. | 206/524.3 |
| 6,003,666 A | 12/1999 | Dougherty | |
| 6,152,672 A | 11/2000 | Alson | |
| 6,189,330 B1 | 2/2001 | Retallick et al. | |

(Continued)

FOREIGN PATENT DOCUMENTS

DE 4413011 10/1995

(Continued)

OTHER PUBLICATIONS

"Containers: Plastic, Storage, Shipping, etc—Thomas Register", *Thomas Register Directory*, (http://www.thomasregisterdirectory.com/containers/), (observed Jan. 11, 2005), 9 pgs.

(Continued)

*Primary Examiner* — Luan K Bui
(74) *Attorney, Agent, or Firm* — Schwegman, Lundberg & Woessner, P.A.

(57) ABSTRACT

A containment system includes a vapor resistant container for a material, and a seal for the vapor resistant container.

8 Claims, 10 Drawing Sheets

U.S. PATENT DOCUMENTS

| | | | |
|---|---|---|---|
| 6,585,008 | B2 | 7/2003 | Shaw et al. |
| 6,660,972 | B1 | 12/2003 | Georgii |
| 6,696,695 | B1 | 2/2004 | Georgii |
| 6,892,933 | B2 * | 5/2005 | Sullivan, Jr. ............. 229/122.33 |
| 7,631,758 | B2 | 12/2009 | Stennes et al. |
| 2001/0000464 | A1 | 4/2001 | Beale |
| 2004/0007572 | A1 | 1/2004 | Payne |
| 2004/0069779 | A1 | 4/2004 | Schmidt et al. |
| 2004/0112439 | A1 | 6/2004 | Eisenhut et al. |
| 2004/0197034 | A1 | 10/2004 | Matias |
| 2005/0252792 | A1 | 11/2005 | Stennes et al. |

FOREIGN PATENT DOCUMENTS

| | | |
|---|---|---|
| EP | 0842870 A1 | 5/1998 |
| GB | 10508 | 0/1915 |
| GB | 951191 | 3/1964 |
| NL | 27648 | 3/1932 |
| WO | WO-9713254 A1 | 4/1997 |
| WO | WO-9844834 A1 | 10/1998 |
| WO | WO-2004043811 A1 | 5/2004 |
| WO | WO-2006113328 A2 | 10/2006 |

OTHER PUBLICATIONS

"European Application Serial No. 06750007.4, Office Action mailed Jun. 23, 2008", 6 pgs.

"European Application Serial No. 06750007.4, Office Action mailed May 14, 2009", 3 pgs.

"International Search Report for corresponding PCT Application No. PCT/US2006/013825", (Oct. 18, 2006), 7 pgs.

"Mercury Recycling & Recovery Services. Hazardous & Universal Waste Disposal—Bethlehem Apparatus Company, Inc.", http://www.web.archive.org/web/20041010185003/http://www.bethlehemapparatus.com/index.htm, (archived Oct. 10, 2004), 1 pg.

"Training and Certification Providers", http://web.archive.org/web/20050126235018/http://training-classes.com/, (archived Jan. 26, 2005), 2 pgs.

* cited by examiner

US 8,047,367 B2

SHIPPING AND STORAGE CONTAINERS

CROSS-REFERENCE TO RELATED APPLICATION

This patent application is a Continuation of application Ser. No. 11/105,181, now U.S. Pat. No. 7,631,758, filed Apr. 13, 2005 and entitled "SHIPPING AND STORAGE CONTAINERS", the contents of which is incorporated herein by reference in its entirety.

BACKGROUND

Human exposure to such biotoxins as lead, asbestos, pesticides and tobacco has been successfully reduced over the past few years. Now the risks of mercury exposure are coming to the attention of the public. Many people have been exposed to mercury through fish consumption, vaccinations and dental amalgam fillings. Potentially hazardous products that contain mercury such as thermometers, batteries and fluorescent lamps are a normal part of everyday life. These sources all contribute to chronic low-level exposure to a pervasive biotoxin that, like lead, pesticides or tobacco, can ruin people's health. Recent studies have linked mercury exposure to increased risk of heart attack in men, to autism and other neurological disorders in children, and to dangerous levels of mercury in the blood of women of childbearing age.

Mercury is unique in that in its solid form it actually has many of the properties of a liquid, including the ability to form a vapor. Mercury vapor can be harmful. Mercury vapor can cause effects in the central and peripheral nervous systems, lungs, kidneys, skin and eyes in humans. It is also mutagenic and affects the immune system. Acute exposure to high concentrations of mercury vapor causes severe respiratory damage, while chronic exposure to lower levels is primarily associated with central nervous system damage. Chronic exposure to mercury is also associated with behavioral changes and alterations in peripheral nervous system. Pulmonary effects of mercury vapor inhalation include diffuse interstitial pneumonitis with profuse fibrinous exudation. Glomerular dysfunction and proteinuria have been observed in mercury-exposed workers. Chronic mercury exposure can cause discoloration of the cornea and lens, eyelid tremor and, rarely, disturbances of vision and extraocular muscles. Delayed hypersensitivity reactions have been reported in individuals exposed to mercury vapor. Mercury vapor is reported to be mutagenic in humans, causing aneuploidy in lymphocytes of exposed workers.

A recent study of exposure to broken "low-mercury" lamps by the New Jersey Department of Environment Protection entitled "Release of Mercury from Broken Fluorescent Bulbs" demonstrated that elevated airborne levels of mercury exist in the vicinity of recently broken lamps, and most likely exceed occupational exposure limits. Because it is very likely that discarded fluorescent bulbs will be broken during conventional waste handling, there is a concern that occupational exposures to workers handling waste materials may occur.

In the United States, 700 million fluorescent and other mercury-containing lamps are removed from service every year. Mercury-containing lamps were added to the Federal Universal Waste Regulations in January of 2000. Other mercury-containing products that are regulated as hazardous waste include dental amalgam, batteries, thermostats, medical devices such thermometers and blood pressure cuffs, and electronics with switches and other mercury components. Regulations govern their packaging, transport and disposal. Most waste haulers and landfills will no longer accept any type of mercury product, including low-mercury lamps so products containing mercury cannot be merely thrown away. Rather, these items must be removed from the normal waste stream and recycled or returned for special handling to minimize environmental impact. Generators of mercury waste are increasingly concerned about the potential long-term and short-term health risks posed by exposure to such materials of employees handling packages with hazardous waste. Many carriers are reluctant to ship hazardous materials due to concerns that some items that contain hazardous materials are fragile and may be prone to breakage during shipment.

BRIEF DESCRIPTION OF THE FIGURES

Embodiments of the present invention are illustrated by way of example and not limitation in the Figures of the accompanying drawings in which.

DETAILED DESCRIPTION

In the following detailed description, reference is made to the accompanying drawings that form a part hereof. These drawings show, by way of illustration, specific embodiments in which the invention may be practiced. These embodiments are described in sufficient detail to enable those skilled in the art to practice the invention. Other embodiments may be utilized and structural or logical changes can be made without departing from the scope of the present invention.

The present invention is directed to several aspects of a convenient, safe and efficient method and system for packaging either originally manufactured products or wastes that need to be recycled at a recycling location. The originally manufactured products generally include elements that, after expiration of the useful life of the product, are generally termed waste. All manufactured products are potentially subject to rough handling or extreme conditions during storage and shipping. Breakage, in some instances, could result in exposure to a harmful element or component that is part of the originally manufactured product. The packaging system and method discussed herein is useful both in recycling spent products as well as original shipping containers. Set forth below is one embodiment of a recycling method and system in which the inventive packaging method and system are used.

Figure 1:
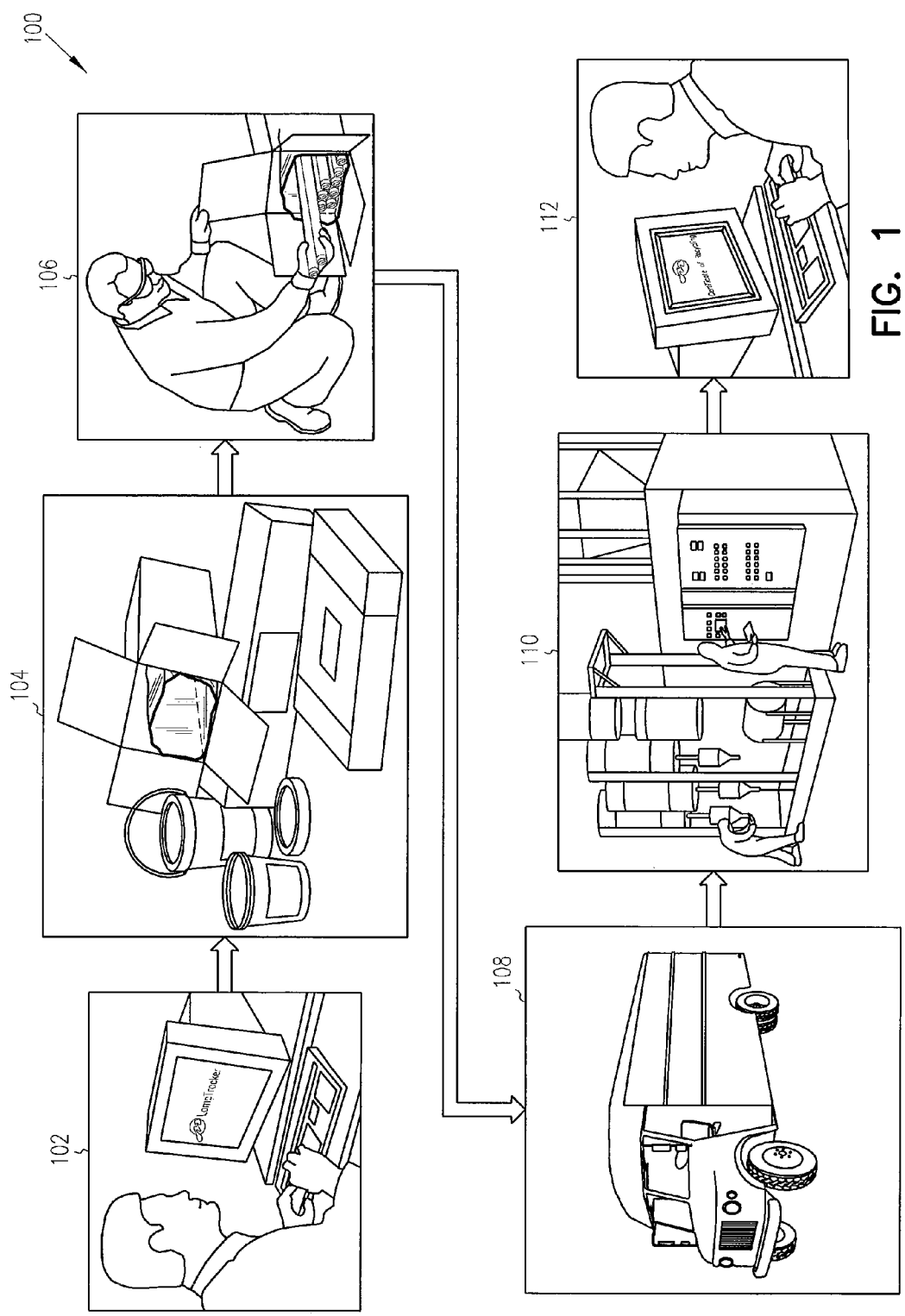
FIG. 1 shows a user recycling waste, according to an example embodiment of a waste recycling process.
Figure 3:
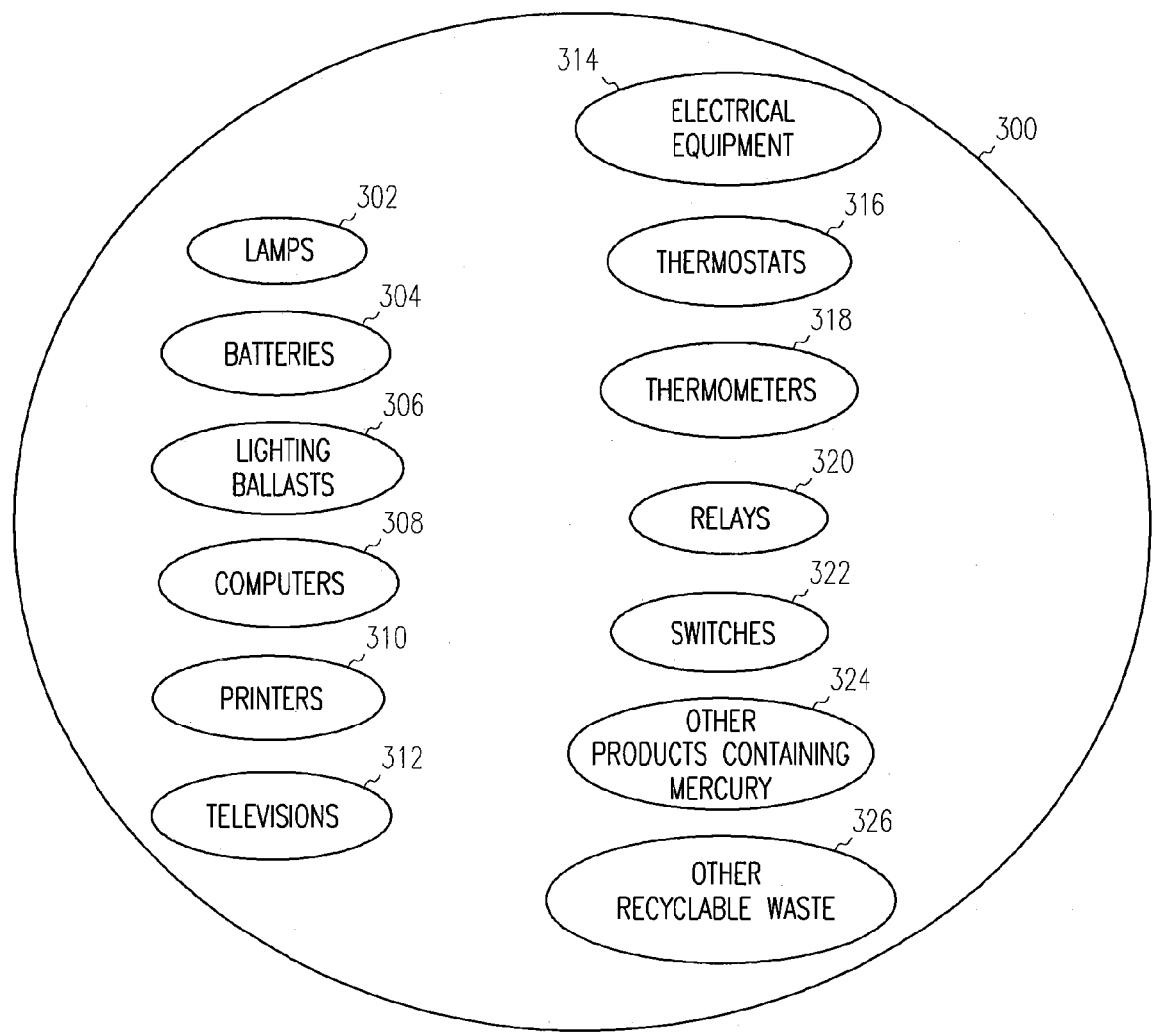
FIG. 3 shows examples of products that may be shipped using the packaging system and method as either new products or during recycling, according to an example embodiment.

FIG. 1 shows a user recycling waste, according to an example embodiment of a waste recycling process 100. First, a user accesses online ordering and places an order for various types of empty containers 102. The empty containers 400 (shown in FIG. 4) include one or more of the example embodiments of the method and system for packaging that is further detailed below. The method and system of packaging includes containers 400 (shown in FIG. 4) that are specially designed or adapted to hold at least one kind of waste. (Various kinds of waste are illustrated in FIG. 3.) One example container is a box that can safely accommodate 4-foot-fluorescent tubes. Another example container 600 is a heavy duty, locking-lid bucket with handles for recycling mercury-containing products such as batteries or thermostats. The order may be placed over a network, such as the Internet or by phone or fax. Alternatively, the order may be part of an automatic reorder program. These containers are then shipped to the user 104, who puts waste, such as fluorescent lamps into the containers 106. The filled waste containers are picked up by one or more shippers and taken to waste recycling facilities 108. After the waste is recycled at the recycling facilities 110, proof of recycling is available to the user 112.

Figure 2:
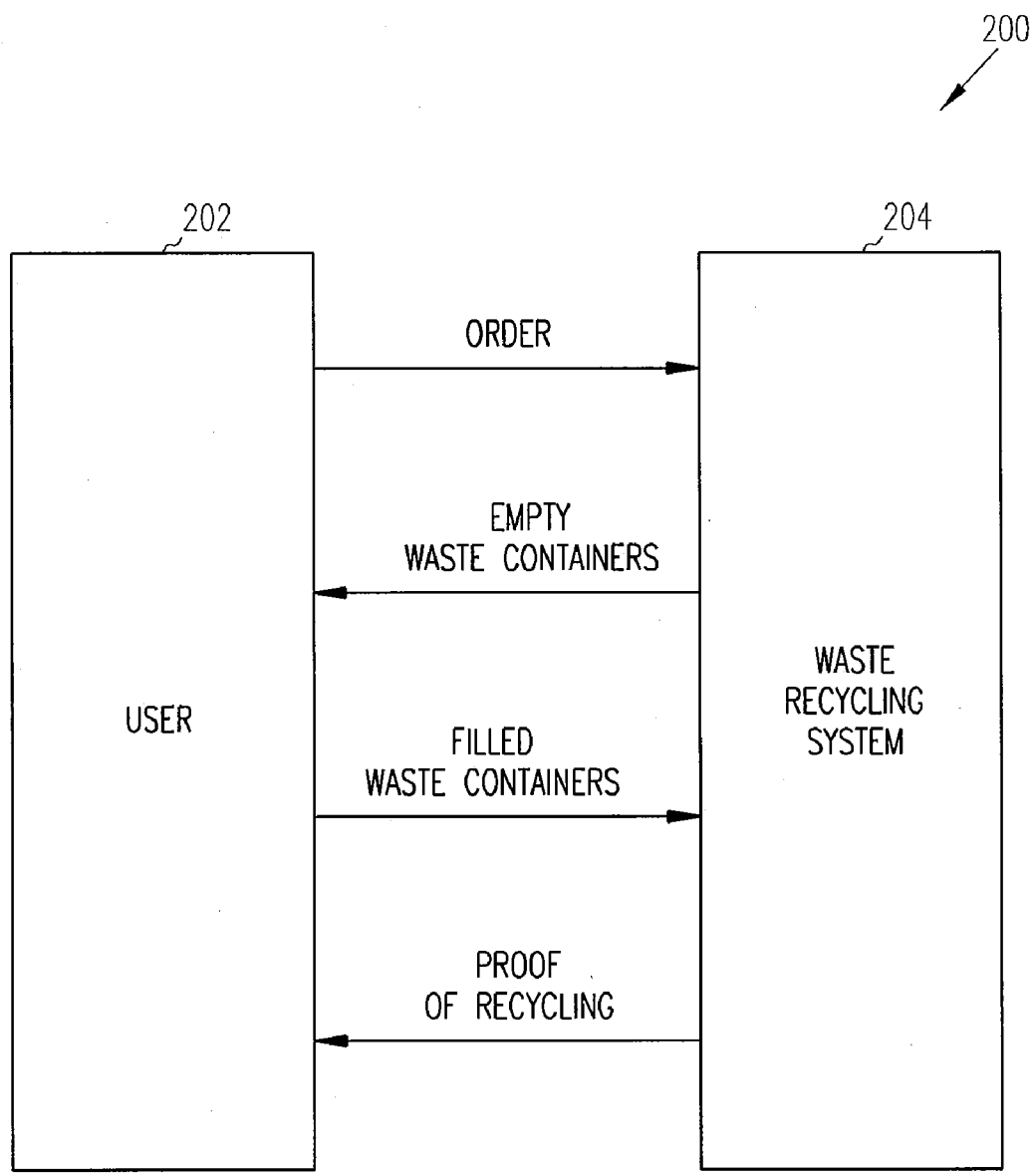
FIG. 2 is a block diagram giving an overview of an example embodiment of a waste recycling system, corresponding to the waste recycling process illustrated in FIG. 1.

FIG. 2 is a block diagram giving an overview 200 of an example embodiment of a waste recycling system, corresponding to the waste recycling process 100, illustrated in FIG. 1. FIG. 2 shows the basic communication between the user 202 and the waste recycling system 204 to carry out the process 100 of FIG. 1. A waste recycling process describes how it is done, while a waste recycling system describes what is doing it. In FIG. 1, when the user places an order for various types of empty waste containers 102, the order is communicated from the user 202 to the waste recycling system 204, as shown in FIG. 2. When, in FIG. 1, these containers are shipped to the user 104, the waste recycling system 204 arranges the shipping for the user 202. When the user fills the containers 106 and returns them 108, they are returned to the waste recycling system 204 from the user 202. When recycling is complete 110, proof of recycling 112 is communicated from the waste recycling system 204 to the user 202. The assignee of this patent also has a patent application (U.S. Ser. No. 09/821,947) that further details different example embodiments and systems for recycling, which is hereby incorporated by reference.

As mentioned above, the packaging system and method discussed herein is useful both in recycling spent products as well as original shipping containers. The containers can also be used to store a product or products before or after shipping the containers. In one embodiment of the invention, it is contemplated that originally manufactured products could be removed from an original shipping container as they are used. Once the original shipping container is empty, spent products could be placed or stored in the shipping container and returned for recycling. With respect to the original shipping containers that are reused, the user would not have to place an order for various types of empty waste containers 102, have the order communicated from the user 202 to the waste recycling system 204.

FIG. 3 shows examples of products that may be shipped or stored as new products or that may be shipped for the purpose of recycling and that use the system and method for packaging. In various embodiments, the method and system for packaging may be used to ship or store different kinds of products 300, such as lamps 302, batteries 304, lighting ballasts 306, computers 308, printers 310, televisions 312, electrical equipment 314, thermostats 316, thermometers 318, relays 320, switches 322, or other products containing mercury 324. The system and method of packaging may also be used to ship mercury in its elemental form. Some additional mercury containing products are manometers, dental amalgams, mercury spill kits, calcium phosphate, ignitron tubes, telephone switches, rectifiers, activated carbon, and mercury contaminated soil. These products and similar mercury containing products or waste will be termed as a mercury device. The packaging system and method may also be used to ship other products or recyclable waste 326 other than mercury devices. Of course, the products and wastes that can be shipped are subject to various laws and regulations in various jurisdictions. These laws and regulations may also change over time so some of the products that currently are designated as not shippable may be designated as shippable in the future. Some laws or regulations require certain types of containers for amounts by weight of a material. The shipping and storage container and systems and methods for packaging described herein are not meant to supplant laws or regulations related to shipping products but can be used to ship products within the parameters of the laws and regulations in a jurisdiction.

Figure 4:
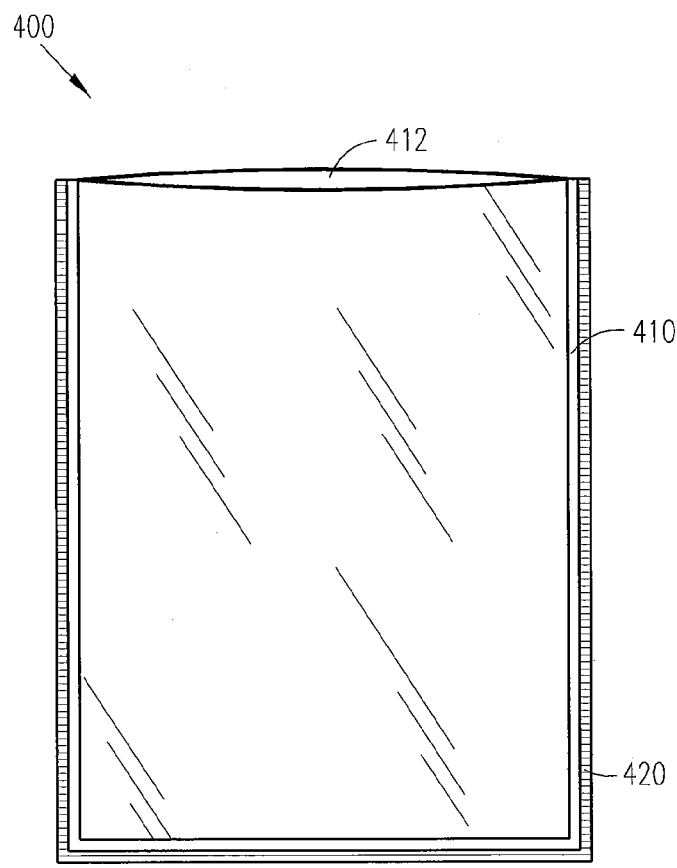
FIG. 4 is a schematic diagram of a system for packaging, according to an example embodiment.

FIG. 4 is a schematic diagram of a system for packaging 400, according to an example embodiment of the invention. The system for packaging 400 can be used to ship or store products, such as mercury containing products. The system for packaging includes a container 410 that includes a vapor resistant barrier 420. A vapor resistant barrier has an $O_2$ transmission rate in the range of 0.0003 to 70 cc/100 in$^2$/24 hrs. In some embodiments of the invention, the vapor resistant barrier has an $O_2$ transmission rate in the range of 0.000 to 35 cc/100 in$^2$/24 hrs. The vapor resistant barrier 420 can be any sort of vapor resistant barrier and the container can be any type of container 410. The container 410 has an open end 412 which can be sealed. Sealing can be accomplished by any means, including folding the portion of the container 410 proximate the open end 412. The folded portion of the container 410 may be retained with an object that contacts the folded portion, or may be retained with an adhesive, such as various types of tape. In another embodiment of the invention, the end can be provided with a fastener for fastening one side of the container to another side of the container. One type of fastener includes a channel and channel-locking member that is pressed to engage the channel with the channel locking member and form a seal. This is commonly referred to as zipping the container to a sealed position. In some embodiments, a zipper element is moved in the channel and the channel-locking member. The zipper element can be moved between a sealed position and an unsealed position. In one example embodiment, the container 410 includes a bag that has a vapor resistant barrier 420. The bag is formed of a foil laminate material that includes a layer of polyethylene plastic and a layer including a foil vapor barrier. The foil vapor barrier 420 is located on the outer surface of the bag. One such bag is available from Poly Lam Products, Corp. of Williamsville, N.Y. Another bag maker is Armand Manufacturing Inc.

of Henderson, Nev. The bags are made from stock that is obtained form Ludlow Coated Products, Inc. of Columbus, Ga., USA as MIL-PRDF-131J Class 1 type material. Ludlow Coated Products refers to the material as Foil-O-Rad 2175-B. The stock material for the bag is also available from Cadillac Products Packaging Company of Troy, Mich. as MIL-PRDF-131J, Type 1, Class 1 material. Cadillac Products refers to the material as CAD PAK N. The bag is dimensioned to enclose a mercury device or a plurality of mercury devices.

It should be noted that other bags also include vapor resistant barriers 410. The other bags are formed of material include vapor resistant barrier made of products such as polyester, mylar, or nylon. The vapor resistant bags, when used as part of the apparatus described herein and according to methods set forth herein, keep mercury levels below specified limits of 0.1 mg/meter$^3$ eight hour time weighted average mercury permissible exposure limit.

Figure 5:
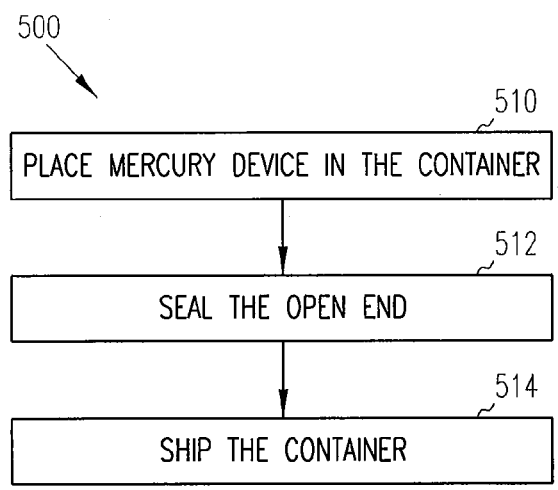
FIG. 5 is a flow chart of an example embodiment of the packaging method using the packaging system shown in FIG. 4.

FIG. 5 is a flow chart of an example embodiment of the packaging method 500 using the packaging system 400 shown in FIG. 4. The packaging method 500 includes placing a mercury device in a container, as depicted by reference 510 and sealing the open end of the container, as depicted by reference numeral 512. Sealing the open end of the container can include folding the open end of the container and then placing an object over the folded end to retain the folded end in position, or can include folding the open end of the container and placing an adhesive such as a tape product over the fold. Sealing the open end can also include bonding one side of the open end to the other side of the open end using an adhesive or a tape or thermally bonding the material of the area near the open end to one another. In other embodiments, sealing the open end 512 can include engaging a channel with a mating pertruperence, such as closing a zip lock type enclosure. In some embodiments of the invention the container with the mercury devices therein is then shipped, as depicted by reference 514. The packaging method 500 can be used to ship or store products.

Figure 6A:
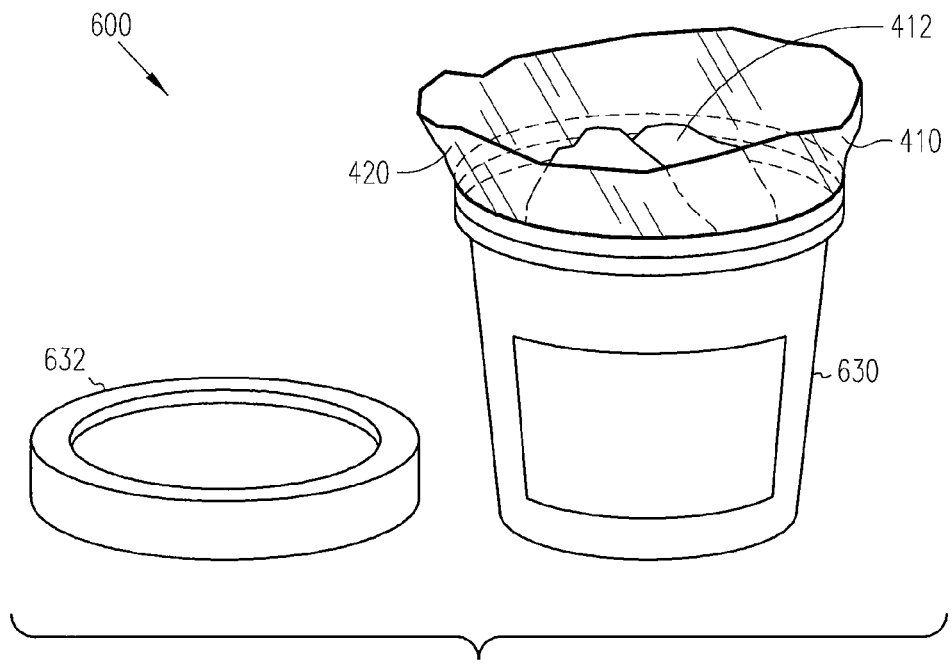
FIG. 6A is a schematic diagram of a system for packaging, according to an example embodiment.
Figure 6B:
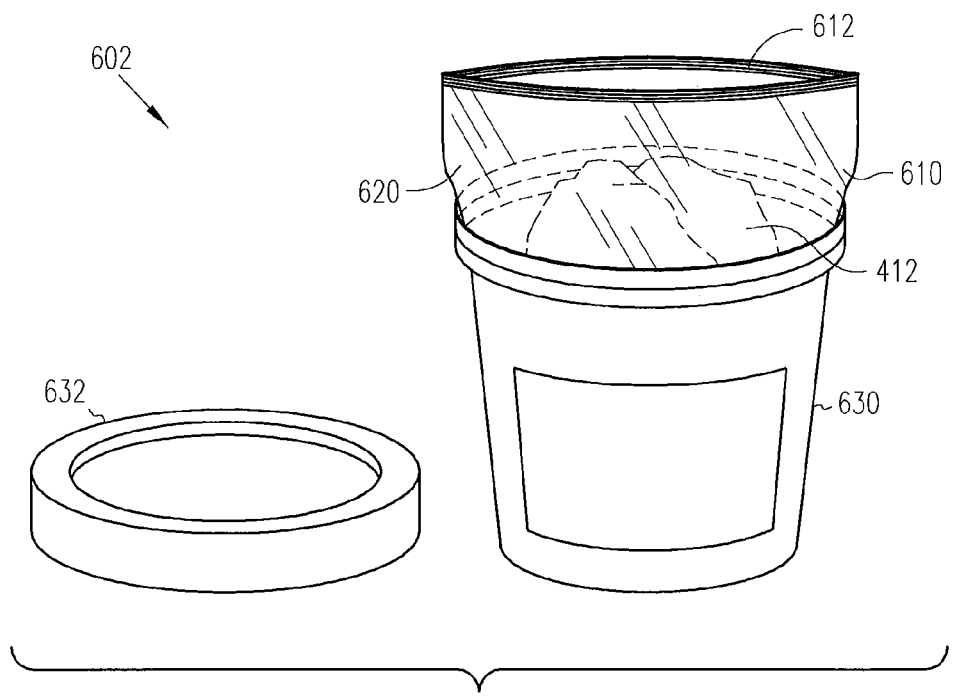
FIG. 6B is a schematic diagram of a system for packaging, according to an example embodiment.

FIGS. 6A and 6B are isometric views of a system for packaging, according to another example embodiment. Many of the elements shown in FIG. 6A are the same as those shown in FIG. 6B. Accordingly, similar or same elements carry the same reference numbers in FIGS. 6A and 6B. The system for packaging 600 can be used to ship or store products, such as mercury containing products. The packaging system 600 includes the container 410 having an open end 412. The container 410 also includes a vapor resistant barrier 420. In one embodiment of the invention the container 410 and the vapor resistant material 420 are made of a laminate of polyethylene in foil that is available from Ludlow Products or Cadillac Products. In other embodiments of the invention a mylar/polyester can be used to form the container 410 and the vapor barrier 420. The container 410 can be any sort of material including a plastic such as polyethylene, paper, or the like. The vapor barrier generally has a transmission rate of O$_2$ in the range of 0.0003 to 70 cc/100 in$^2$/24 hrs. It should be noted that the container 410 can be formed in any type of shape as needed or desired. The packaging system 600 further includes a second container 630. As shown in FIG. 6A the second container 630 is a hard-sided, plastic bucket. The second container 630 also includes a lockable lid 632 as shown in FIG. 6A. It should be noted that the second container 630 is not limited to a plastic bucket but could also be steel drum, trash can, dumpster, rolloff or the like. The first container 410 and specifically the open end 412 are not provided with any type of feature, such as a feature for sealing the open end of the first container 410. The shipping system 600 can be used for originally manufactured devices or to recycle spent devices. In one embodiment of the invention, originally manufactured devices are shipped using the packaging system 600. The originally manufactured devices are put to use or sold or set out for sale. Devices that need to be recycled can then be placed into the shipping system 600 for return to a recycling center or to the original manufacturer.

FIG. 6B shows another embodiment of a packaging system 602. The system for packaging 602 can be used to ship or store products, such as mercury containing products. The packaging system 602 includes the first container 610 having a vapor resistant film 620. The container 610 also includes a zippered end or a sealable end. The packaging system 602 also includes a second container 630 and a lockable lid 632. It should be noted that container 410 (shown in FIG. 6A) might have different dimensions than the container 610 shown in FIG. 6B. Although the container 410 and the container 610 each fit within a second container 630 there may be a need for more or less material when providing a zippered end or sealable end on the container, such as the container 610 shown in FIG. 6B. Again the container 610 is also provided with a vapor resistant barrier 620 having a rate of O$_2$ flow in the range of 0.0003 to 70 cc/100 in$^2$/24 hrs. A vapor resistant barrier can be foil attached to polyethylene as a laminate, a laminate of polyester and mylar or the like. In addition, a vapor resistant barrier 620 can be provided on polyethylene or plastic such as a plastic bag, paper, such as a sack, cardboard or any other container. Simply put, the container 410, 610 is not limited to any particular material and can be a plastic, such as polyethylene, paper, or cardboard or the like. It is also contemplated that the container 410, 610 could also be another hard-sided bucket made of any of a number of materials.

Figure 7:
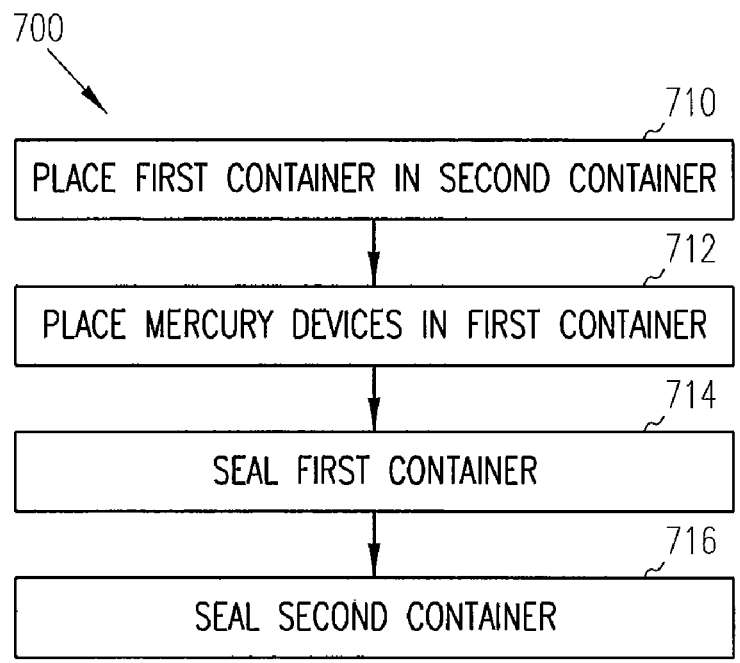
FIG. 7 is a flow chart of an example embodiment of the packaging method using the packaging system shown in FIG. 6.

FIG. 7 is a flow diagram of a method 700 of packing which employs the packaging systems 600, 602 shown in FIGS. 6A and 6B. The method 700 includes placing a first container within a second container 710. As discussed above, the first container includes a vapor resistant material. A mercury-containing device or devices are placed in the first container, as depicted by reference numeral 712. The mercury device can be any type of device. As shown in FIGS. 6A and 6B the mercury device is a battery or plurality of batteries. The mercury device can be placed in the first containers 712 as a packaging method for originally packaging the products or as a packaging method for recycling spent mercury devices. Once the mercury devices are placed within the first container 610, 410, the open end of 412, 612 of the container 410, 610, respectively, is sealed. The open end 612 of the container 610 is sealed using a sealing device that is provided at the open end 612, in the case of the container 610. When the container 410 has a open end 412, sealing can include folding or rolling the open end, placing the folded end of the container 410 on top of the unfolded or unrolled portion of the container 410 and placing the lockable lid 632 onto the second container 630 to retain the folded end in place. In other words sealing does not necessarily mean a sealant or adhesive has to be used. In an alternative example embodiment, sealing can include providing an adhesive at the open end, clamping the open end or a folded open end or taping the open end 412 shut. Tape can also be used to retain a folded open end of a container 410. Once the open end is sealed, the second container is sealed as depicted by reference numeral 716. Again the method 700 can be used either to return spent mercury devices to a selected location for recycling or can be used to package originally manufactured equipment for shipping to a store for resale or shipping to an end user. In some embodiments of the invention, the packaging systems 600, 602 can be used to ship out newly manufactured or originally manufactured equipment, emptied and then used to return or deliver spent mercury devices to a recycling center or back to the original manufacturer for recycling. The packaging method 700 can be used to ship or store products.

Yet another example embodiment of a packaging system used to ship or store products, such as mercury containing products or hazardous material, includes a pallet and a zippered or sealable enclosure of sufficient size to enclose the mercury containing products or hazardous material on the pallet. Hazardous material includes hazardous products or hazardous waste. In some example embodiments, the zippered or sealable enclosure is a bag. The zippered or sealable enclosure is provided with the vapor resistant layer. The zippered or sealable enclosure is placed on the pallet. Mercury containing products or hazardous material is then placed on the pallet. Once the mercury containing material or the hazardous material is placed on the pallet, the zippered or sealable enclosure is positioned around the mercury containing material or the hazardous material. The zippered or sealable enclosure is then sealed. In this way, the mercury containing material or hazardous material placed on the pallet is sealed.

Figure 9:
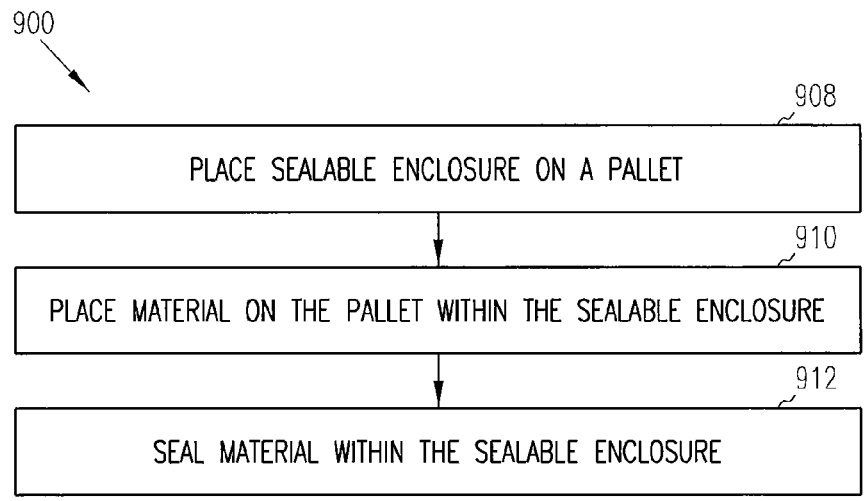
FIG. 9 is a flow chart of an example embodiment of a packaging method using the packaging system shown in FIG. 8.

FIG. 9 is a flowchart of an example embodiment of a packaging method 900 using the packaging system discussed above. The system for packaging 900 can be used to ship or store products, such as mercury containing products. The packaging method 900 includes placing a sealable enclosure on a pallet 908 and then placing mercury devices on the pallet within the sealable enclosure, as depicted by reference 910. Mercury devices that are placed on the pallet may be devices that are already in containers or larger separate independent devices. The sealable enclosure is then sealed as depicted by reference number 912. The sealable enclosure includes a vapor resistant barrier. The packaging method 900 can be used to ship or store products.

Figure 10:
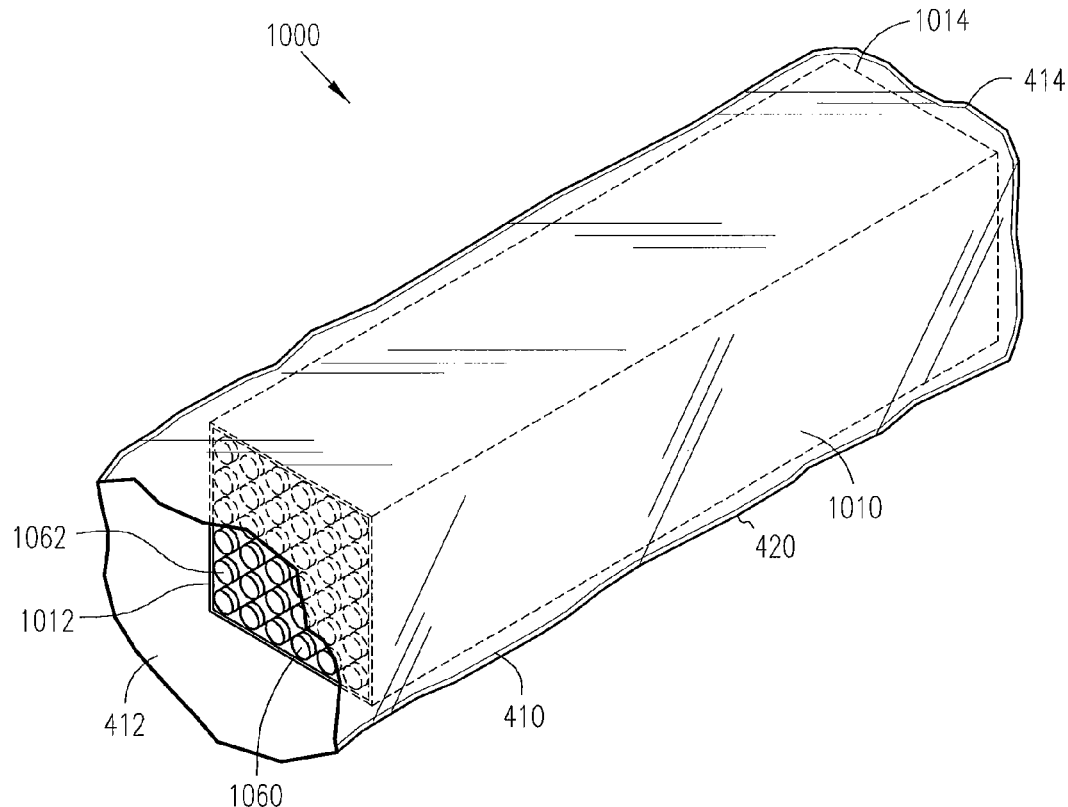
FIG. 10 is a perspective view of a system for packaging, according to an example embodiment.

FIG. 10 is a perspective view of a system 1000 for packaging, according to an example embodiment. The system for packaging 1000 can be used to ship or store products, such as mercury containing products. The packaging system 1000 includes a first container 410 having a vapor resistant barrier 420 and having an open end 412. The vapor resistant barrier has an $O_2$ transmission rate in the range of 0.0003 to 70 cc/100 in$^2$/24 hrs. In some embodiments of the invention, the vapor resistant barrier has an $O_2$ transmission rate in the range of 0.0004 to 35 cc/100 in$^2$/24 hrs. The vapor resistant barrier can be any sort of vapor resistant barrier and the container can be any type of container. The container has an open end 412 which can be sealed as mentioned previously sealing can be accomplished by any means such as merely folding the container near the open end 412 and retaining the folded end in the folded position. The container may also take any form. The container 410 may be a plastic like material, a paper like material, and may be flexible or inflexible. In one example embodiment, the container 410 includes a bag that has a vapor resistant barrier 420. The bag is formed of a foil laminate material that includes a layer of polyethylene plastic and a layer of foil vapor barrier. The foil vapor barrier 420 is located on the outer surface of the container 410. One such bag is available from PolyLam Products of a Williamsville, N.Y. Another bag maker is Armand Manufacturing Inc. of Henderson, Nev. The bag is made from stock that is obtained from Ludlow Coated Products, Inc. of Columbus, Ga., U.S.A. as MIL-PRDF-131J class 1 material. Ludlow Coated Products refers to the material as foil-O-Rad 2175-B. The stock material is also available from Cadillac Products as MIL-PRDF-131J, type 1, class 1 material. Cadillac Products refers to the material as CADPAC-N.

Although the bag is shown as loosely fitting around a second container 1010 it should be noted that the first container or bag 410 can be formed or dimensioned to closely fit about the container 1010. In one embodiment of the invention a closed end 414 of the container 410 includes gussets so that it fits more closely around a square rectangular end of the container 1010. The container 1010 fits within the container 410. The container 1010, as shown in FIG. 10, is a corrugated box that receives one or more fluorescent lamps such as fluorescent lamps 1060, 1062. The box 1010 is made of a single layer of corrugated cardboard. In some instances a fluorescent lamp 1060, 1062 may break during shipment. The corrugated cardboard of the second container 1010 prevents glass material from a broken lamp 1060, 1062 from puncturing or cutting or otherwise forming an opening which will allow vapor to escape from the first container 410. The second container 1010 does not necessarily have to be made of corrugated material it can be made of any type of material which will tend to prevent or reduce the possibility of a mercury device, such as fluorescent lamps 1060, 1062, from puncturing or otherwise causing an opening in the container 410 that includes the vapor resistant layer 420.

The box 1010 includes a set of flaps at each end 1012, 1014 of the box. The flaps allow the box to be formed on site. In other words, the box 1010 can be shipped flat so as to save on space and then formed at the site where it will be loaded either with original lamps or spent fluorescent lamps 1060, 1062. Each end of the box or second container 1010 is sealed. At least one end, such as end 1012 is sealed after the second container 1010 is loaded or filled with mercury devices such as fluorescent lamps 1060, 1062. The box or second container 1010 can be of any size for holding various mercury devices. For example in one embodiment the box is sized so as to fit approximately 146 t-8 4 foot lamps. In another embodiment the box is sized to fit approximately 46 t-8 8 foot lamps. After the mercury devices, such as fluorescent lamps 1060, 1062 are placed in the box the open end 1012 is closed and sealed. The open end of the first container 410 that includes the vapor barrier 420 is then sealed by any of the means or in any fashion as discussed above.

Figure 11:
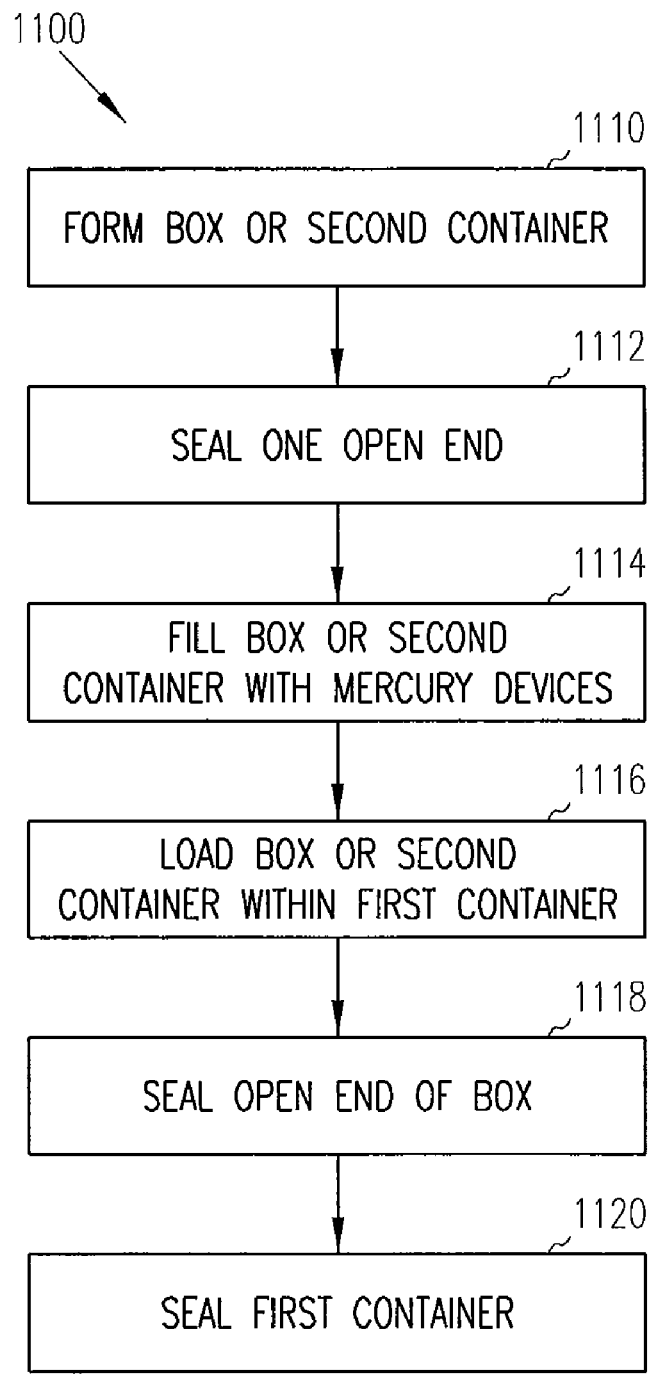
FIG. 11 is a flow chart of an example embodiment of a packaging method using the packaging system shown in FIG. 10.

FIG. 11 is a flowchart of an example embodiment of a packaging method 1100 using the packaging system 1000 shown in FIG. 10. The packaging method 1100 includes forming a box or second container, as depicted by reference number 1110. One open end of the container is then sealed as depicted by reference numeral 1112. The box or second container is then placed within the first container as depicted by reference numeral 1114. The box or second container is then loaded with mercury devices as depicted by reference numeral 1116. Mercury devices can include any type of mercury device but as shown in FIG. 10 the mercury devices are fluorescent lamps. Fluorescent lamps contain mercury. After the second container is loaded with mercury devices, the open end of the box is sealed as depicted by reference numeral 1118 and the first container is then sealed as depicted by reference numeral 1120. The packaging method 1100 can be used to ship or store products.

Figure 12:
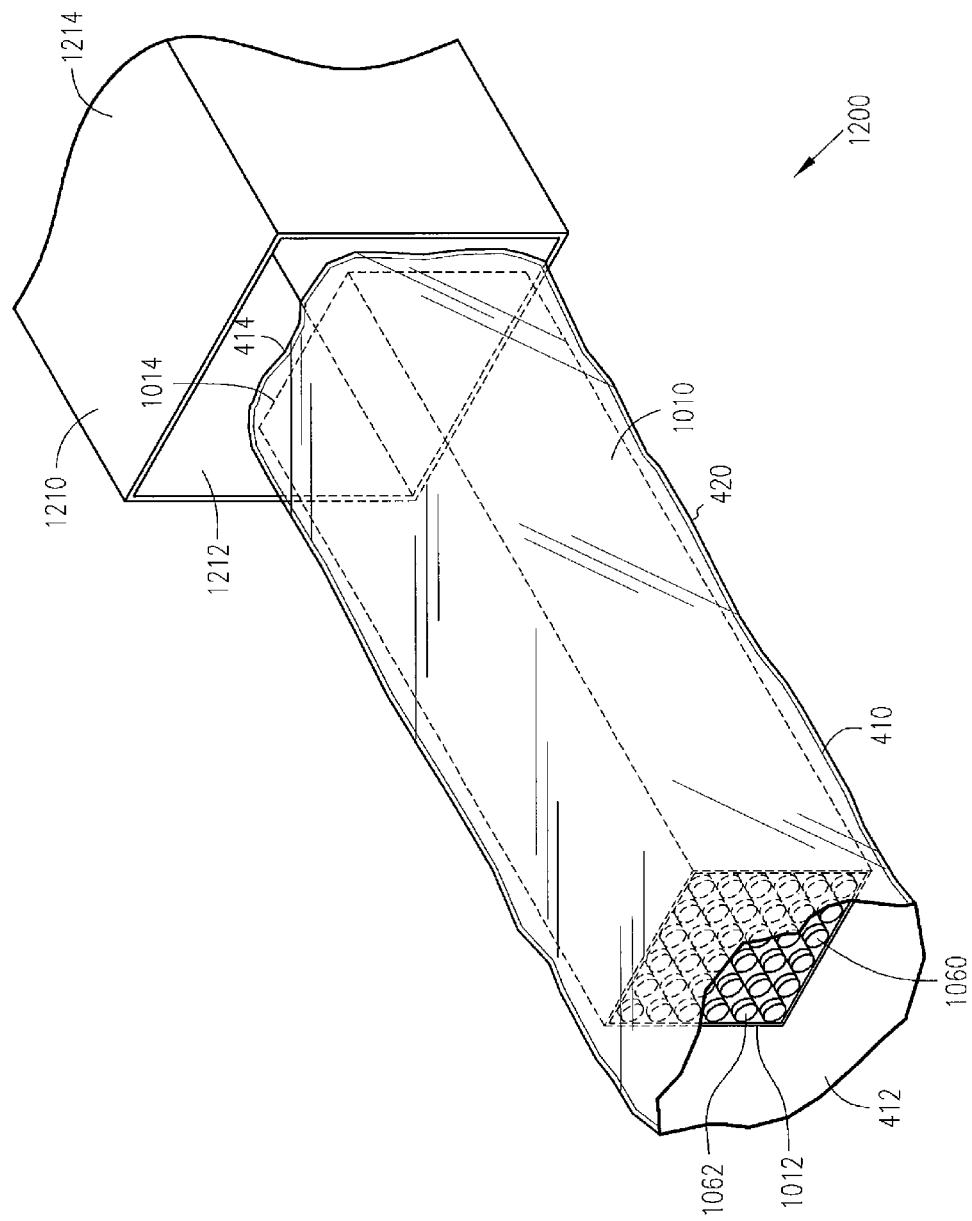
FIG. 12 is a schematic diagram of a system for packaging, according to an example embodiment.

FIG. 12 is a schematic diagram of a packaging system 1200 according to an example embodiment of the invention. The system for packaging 1200 can be used to ship or store products, such as mercury containing products. The packaging system 1200 includes the first container 410 having a vapor resistant barrier 420. The first container 410 includes an open end 412 and a closed end 414. The packaging system 1200 also includes a second container 1010 that has an open end 1012 and a closed end 1014. The second container 1010 is positioned within the first container 410. Mercury devices such as fluorescent lamps 1060, 1062 are positioned within the second container 1010. The first container 410 and the second container 1010 fit within a third container 1210. The third container includes an open end 1212 and a closed end 1214. Each of the open end 1212 and the closed end 1214 are sealable. The dimensions of the third container 1210 can be of any of dimension however in one particular embodiment the third container 1210 has dimensions that are close enough to the second container 1010 so that the first container 410 may be pinched or fit without moving the first container 410. In other words, there is a clearance between the first container 1010 and a second container 1210 that is sufficient to allow relatively little movement of the first container 410 with respect to either the second container 1010 or the third container 1210.

In one example embodiment, the third container is formed of a single layer of corrugated materials, such as cardboard. The open end 1212 includes a set of flaps so that the open end 1212 may be closed. The closed end 1214 also includes flaps. In one example embodiment, the second container 1010 fits with an adequate clearance within the third container 1210 so that the first container 410 is pinched or substantially immobilized. The result is a double walled container having a vapor barrier between a first and a second wall. In the alternative one can think of having a first corrugated box 1010 within a second corrugated box 1210 with a vapor barrier between the box 1010 and the box 1210. The box 1010 can be thought of as an inner box while the box 1210 can be thought of as an outer box. The box 1010 substantially prevents or inhibits waste materials or mercury devices from forming an opening in the container 410 having the vapor resistant barrier 420 while the outer box 1210 substantially prevents other outside elements from breaking the vapor barrier 420 of the first container 410. The container including the vapor barrier substantially lessens the flow of gas into and out of the container. This reduction in the flow of gas not only contains various vapors but also is thought to further reduce the breakage of lamps within the containers. The lamp tubes are vacuum sealed so when a lamp breaks, gas moves to equalize the pressure. Using a vapor barrier substantially lessens the amount of gas, such as air, moving within the container or moving from outside the container to the inside of the container. Gas movement can break glass so lessening the amount of gas movement also may lessen the amount of breakage of lamps within the container. In addition, the gas trapped within first container also may act as a cushion. The cushioning effect of the trapped gas may further reduce breakage of lamps within the first container 410.

Figure 13:
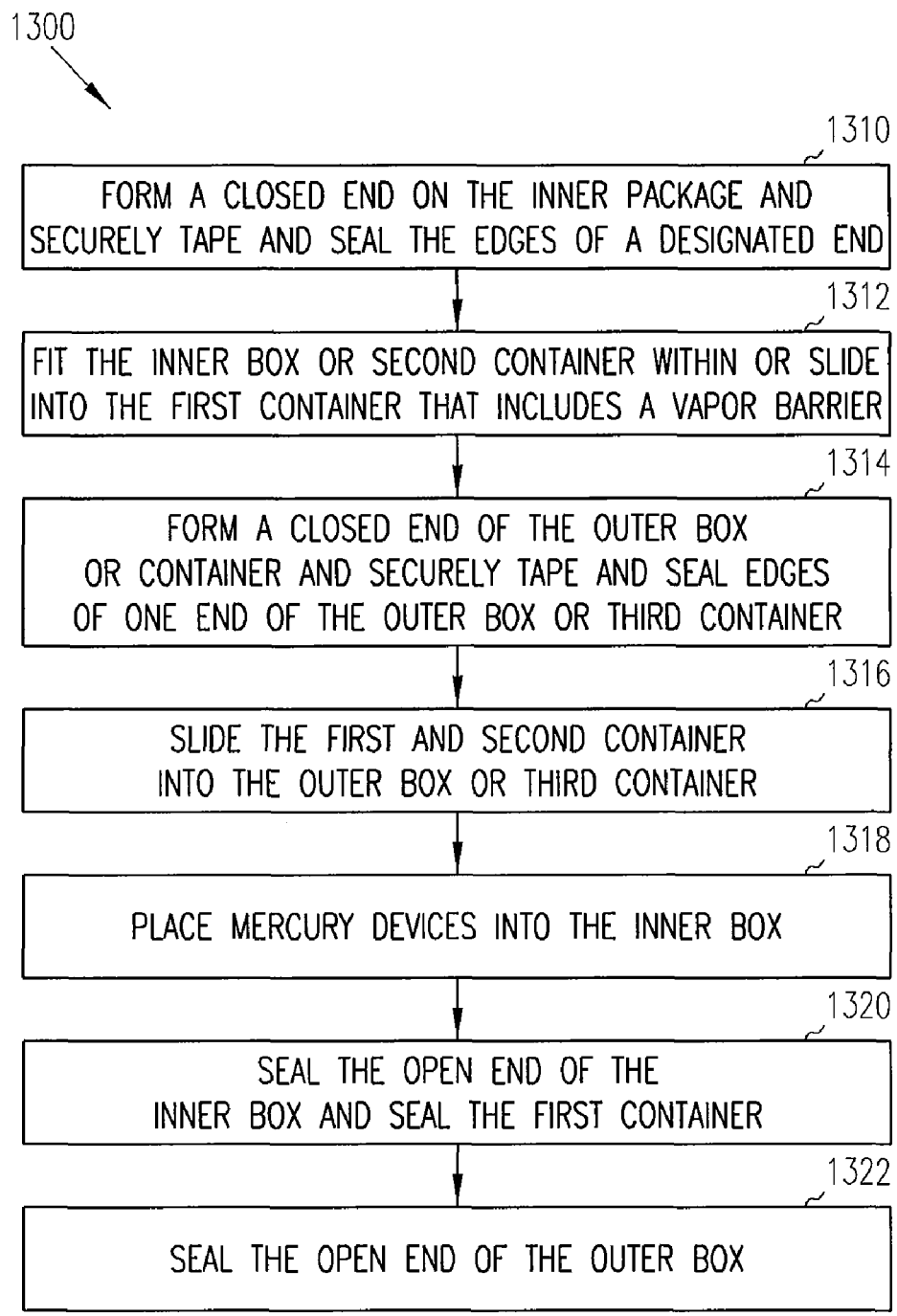
FIG. 13 is a flow chart of an example embodiment of the packaging method using the packaging system shown in FIG. 12.

FIG. 13 is a flowchart of an example embodiment of a packaging method 1300 using the packaging system 1200 shown in FIG. 12. As shown in FIG. 13 the initial step is to form the inner package 1010 and specifically to form the closed end 1014 of the inner package 1010 by securely taping and sealing all of the edges of a designated end of the inner box or box 1010. Next the inner box or second container 1010 is fit within or slid into the first container 410 that includes the vapor barrier 420, as depicted by the illustration found having the reference numeral 1312. The outer box or container 1210 and specifically the closed end 1212 of the outer box is formed by securely taping and sealing all edges of one end of the outer box or third container 1210, as depicted by reference numeral 1314. As depicted by reference numeral 1316 the first and second container are then slid into the outer box or third container 1210. The first container 410, inner box or second container 1010, and outer box or third container 1210 can each or all be kept closed during storage. As depicted by reference numeral 1318 mercury devices such as lamps are placed into and fill the inner box. Once the inner box or second container 1010 is full all of the edges of the inner box and specifically the open end 1012 of the inner box are sealed. The first container 410 and specifically the open end 412 of the first container 410 are also sealed, as depicted by reference numeral 1320. Once the inner box or second container 1010 as well as the first container 410 are sealed the open end 1212 of the outer box or third container is then sealed, as depicted by reference numeral 1322. This is merely one embodiment of the method 1300 for using the packaging system 1200 shown in FIG. 12. The packaging method 1300 can be used to ship or store products.

Figure 8:
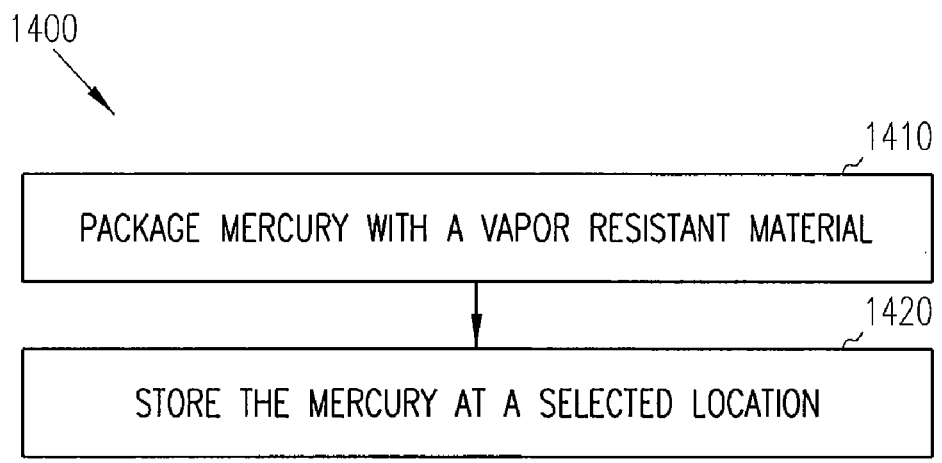
FIG. 8 is a flow diagram of a method 1400 that includes packaging mercury, according to an example embodiment.

FIG. 8 is a flow diagram of a method 1400 that includes packaging mercury with a vapor resistant material 1410, and storing the mercury at a selected location 1420. Packaging mercury with a vapor resistant material 1410 includes packaging elemental mercury, packaging a waste material including mercury, packaging a product including mercury, packaging a waste product including mercury, or the like. Packaging mercury with a vapor resistant material 1410 includes packaging mercury in a bag that includes vapor resistant material, packaging mercury in a wrap that includes vapor resistant material, lining a container with a vapor resistant material, or the like. It should be understood that there is no limitation on the size of the container. It should also be pointed out that the method 1400 can be used for shipping or storing of materials or for a combination of shipping and storing of materials. For example, the container could be as large as a dumpster or waste roll-off, or could be as small as a container for shipping new batteries or lamps.

It should be noted when looking at both FIGS. 12 and 13 that any one of the first container 410, second container 1010 and third container 1210 can be provided with a vapor resistant barrier. For example, a vapor resistant barrier could be placed on the inside of the third container 1210 or outer box, and the vapor barrier could be provided on either the inside or the outside of the inner box or second container 1010. As shown the first container 410 includes a vapor resistant barrier. The material used to form the vapor barrier is the same type of stock material as discussed above.

It is to be understood that the above description it is intended to be illustrative, and not restrictive. Many other embodiments will be apparent to those skilled in the art, upon reviewing the above description. The scope of the invention should, therefore, be determined with reference to the appended claims, along with the full scope of equivalents to which such claims are entitled.

Although the present invention has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense.

The invention claimed is:

1. A containment system comprising:
a vapor resistant container having an inner package for receiving contents including a plurality of mercury devices, the container including a flexible film having a foil laminate;
a seal for the vapor resistant container; and
an outer container having a cardboard wall and a formed end flap, the outer container having a first flat configuration in which the end flap is unsealed and having a second configuration in which the outer container is adapted to receive the vapor resistant container, the inner package, the seal, and the contents of the vapor resistant container, and in which the end flap is folded and secured; and wherein the vapor resistant container and the seal are configured to have an $O_2$ transmission rate of less than 70 cc/100 in$^2$/24 hours.

2. The containment system of claim 1 wherein the vapor resistant container has an $O_2$ transmission rate of less than 10 cc/100 in$^2$/24 hrs.

3. The containment system of claim 1 wherein the vapor resistant container includes a bag and wherein the flexible film includes poly.

4. The containment system of claim 1 wherein the vapor resistant container includes a bag having gussets.

5. The containment system of claim 1 wherein the seal includes a channel.

6. The containment system of claim 1 wherein the inner package includes a box.

7. The containment system of claim 6 wherein the vapor resistant container includes a bag, the inner package including a material to prevent puncturing of the vapor resistant container.

8. The containment system of claim 7 wherein the inner package substantially prevents relative motion between a device within the inner package and the bag.

* * * * *